United States Patent
Bauck et al.

(10) Patent No.: US 9,611,844 B2
(45) Date of Patent: Apr. 4, 2017

(54) RECIPROCATING PUMP VALVE ASSEMBLY WITH THERMAL RELIEF

(75) Inventors: Mark L. Bauck, Coon Rapids, MN (US); Zaixing You, Suzhou Jiangsu (CN); Xueshui Wu, Suzhou Jiangsu (CN); Clinton Craig Grandahl, Jr., Wilson, WI (US)

(73) Assignee: Graco Minnesota Inc., Minneapolis, MN (US)

( * ) Notice: Subject to any disclaimer, the term of this patent is extended or adjusted under 35 U.S.C. 154(b) by 504 days.

(21) Appl. No.: 14/112,683

(22) PCT Filed: Apr. 25, 2012

(86) PCT No.: PCT/US2012/034974
§ 371 (c)(1),
(2), (4) Date: Oct. 18, 2013

(87) PCT Pub. No.: WO2012/149005
PCT Pub. Date: Nov. 1, 2012

(65) Prior Publication Data
US 2014/0044567 A1    Feb. 13, 2014

Related U.S. Application Data

(60) Provisional application No. 61/479,487, filed on Apr. 27, 2011.

(51) Int. Cl.
  *F04B 49/035* (2006.01)
  *F04B 53/12* (2006.01)
  *F16N 11/10* (2006.01)
(52) U.S. Cl.
  CPC ............ *F04B 49/035* (2013.01); *F04B 53/12* (2013.01); *F04B 53/126* (2013.01); *F16N 11/10* (2013.01)

(58) Field of Classification Search
  CPC ...... F04B 49/035; F04B 53/12; F04B 53/126; F16N 11/10
  See application file for complete search history.

(56) References Cited

U.S. PATENT DOCUMENTS 3,094,938 A     6/1963  Blomeke et al.
3,635,125 A *   1/1972  Rosen ................... B05B 9/0409
                                                   267/159

(Continued)

FOREIGN PATENT DOCUMENTS

CA     473946 A      5/1951
CN     101668948 A   3/2010

(Continued)

OTHER PUBLICATIONS

International Search Report and Written Opinion, mailed Nov. 9, 2012.

(Continued)

*Primary Examiner* — Dominick L Plakkoottam
(74) *Attorney, Agent, or Firm* — Kinney & Lange, P.A.

(57) ABSTRACT

A reciprocating pump comprises a cylinder, an inlet check valve, a piston, an outlet check valve and a purge circuit. The cylinder has a first end and a second end. The inlet check valve is disposed proximate a first end of the cylinder. The piston is disposed within the cylinder between the inlet check valve and the second end. The outlet check valve is disposed within the piston. The purge circuit extends across the inlet check valve and the outlet check valve to fluidly couple the first end and the second end.

16 Claims, 6 Drawing Sheets

(56) References Cited

U.S. PATENT DOCUMENTS

| | | | | |
|---|---|---|---|---|
| 3,653,588 | A * | 4/1972 | Dreibelbis | F24F 11/047 137/513.3 |
| 3,677,049 | A * | 7/1972 | Cartwright | B21C 23/007 72/271 |
| 3,847,528 | A * | 11/1974 | Farrell | B29C 45/67 425/450.1 |
| 3,861,471 | A * | 1/1975 | Douglas | E21B 43/12 166/105.5 |
| 3,943,823 | A | 3/1976 | Tammy | |
| 4,211,352 | A * | 7/1980 | Zilka | B25C 1/043 227/130 |
| 4,821,850 | A * | 4/1989 | Geiling | F16F 9/368 137/312 |
| 4,917,580 | A | 4/1990 | Schnetzer | |
| 5,065,577 | A * | 11/1991 | Markunas | F03C 1/0686 60/450 |
| 5,188,518 | A | 2/1993 | Saita | |
| 5,527,160 | A | 6/1996 | Kozumplik, Jr. et al. | |
| 5,571,000 | A * | 11/1996 | Zimmermann | F04B 43/026 137/510 |
| 6,183,447 | B1 * | 2/2001 | Urrutia | A61M 5/007 604/247 |
| 6,378,412 | B1 * | 4/2002 | Wittich | F15B 15/1433 91/443 |
| 7,603,855 | B2 | 10/2009 | Strong | |
| 2006/0112478 | A1 * | 6/2006 | Kolar | F04D 15/0209 4/300 |
| 2008/0240944 | A1 * | 10/2008 | Arens | F01L 25/063 417/399 |
| 2009/0155093 | A1 * | 6/2009 | Paluncic | F04B 9/107 417/217 |
| 2012/0060941 | A1 | 3/2012 | Roman | |

FOREIGN PATENT DOCUMENTS

| | | |
|---|---|---|
| GB | 794916 A | 5/1958 |
| JP | 10-024825 A | 1/1998 |
| JP | 2000-345957 A | 12/2000 |
| TW | 200722622 A | 6/2007 |
| WO | 0114684 A2 | 3/2001 |
| WO | 2010135419 A1 | 11/2010 |

OTHER PUBLICATIONS

Lee and Li, Taiwan Office Action with English translation, Nov. 13, 2015, 9 pages.

China Science Patent & Trademark Agent Ltd., Chinese First Office Action, Mar. 16, 2015, 12 pages.

European Patent Office, Extended European Search Report, Apr. 17, 2015, 7 pages.

* cited by examiner

Fig. 7 ure designed to pump fluids. Specifically, piston 132A
RECIPROCATING PUMP VALVE ASSEMBLY WITH THERMAL RELIEF

BACKGROUND

The present invention is directed generally to reciprocating piston pumps and more particularly to valves used in reciprocating piston pumps.

Reciprocating piston pumps typically include an air-driven motor that converts a steady flow of compressed air into linear reciprocation of an air motor shaft using appropriate reversing valves and pilot valves, as are known in the art. The air motor shaft is then used to drive a linearly reciprocating piston that can be configured to pump in both directions using appropriate check valves.

These types of linearly reciprocating double-acting piston pumps are commonly used in lubrication dispensing systems to deliver highly viscous lubricants, such as oil. These pump systems are typically installed in commercial facilities arranged for high-volume dispensing operations. For example, large containers or drums are connected to the pump inlet, sometimes through the use of extension tubing. Likewise, the fluid dispensing device, such as a hand-operated nozzle, is connected to the pump via lengthy extension hoses so the nozzle can be brought to a specific location. It is undesirable due to convenience and waste factors to purge these systems after each use. However, lubricant remaining in the extension hoses can compromise the system if lubricant is not dispensed for a long period of time. In particular, thermal expansion of the lubricant due to temperature swings can cause the lubricant to increase in pressure to such a degree so as to rupture the extension hose or any other pressure containing component. For example, sometimes the container and pump can be stored outside of the facility for safety and convenience factors. Temperatures rises downstream from the pump system, such as in the dispenser and extension hose, can cause the oil to expand, which causes extreme rises is system pressure.

Conventional lubrication systems incorporate a pressure relief valve in the extension hose near the pump to permit thermally expanded lubricant to bleed from the system. Such a solution, however, requires the use of additional tubing and a container to capture the purged lubricant, which adds undesirable inconvenience, expense and complexity to the system. There is, therefore, a need for a simpler and less expensive venting mechanism.

SUMMARY

The present invention is directed to a reciprocating pump. The reciprocating pump comprises a cylinder, an inlet check valve, a piston, an outlet check valve and a purge circuit. The cylinder has a first end and a second end. The inlet check valve is disposed proximate a first end of the cylinder. The piston is disposed within the cylinder between the inlet check valve and the second end. The outlet check valve is disposed within the piston. The purge circuit extends across the inlet check valve and the outlet check valve to fluidly couple the first end and the second end.

DETAILED DESCRIPTION

Figure 1:
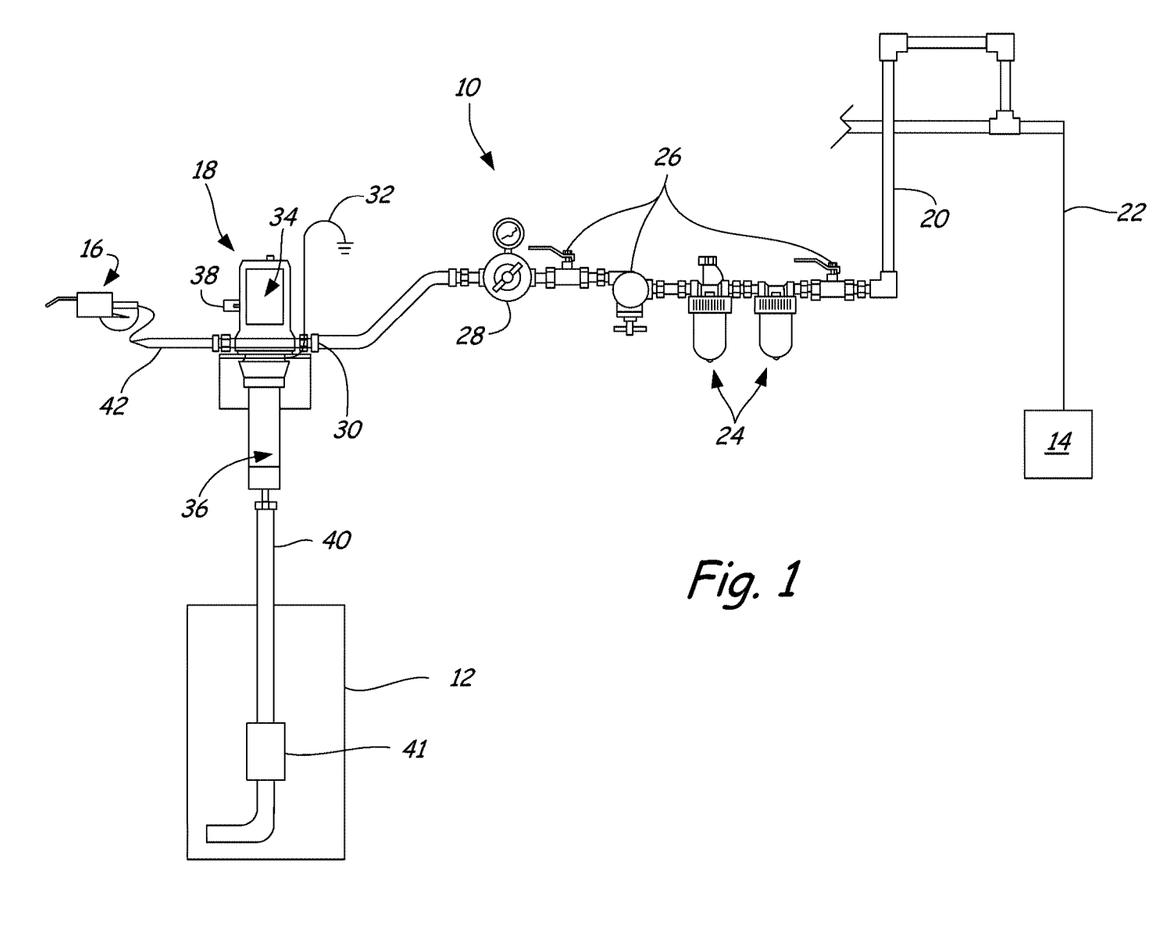
FIG. 1 is a schematic of a lubricant dispensing system comprising a fluid container, an air source and a linear displacement pump having a thermal relief system of the present invention.

FIG. 1 is a schematic of lubricant dispensing system 10 comprising fluid container 12, air source 14, dispenser 16 and linear displacement pump 18, which has a thermal relief system of the present invention. Lubricant dispensing system 10 is provided with pressurized air from air source 14 through air distribution line 20. Air distribution line 20 is spliced into air source line 22, which is directly coupled to air source 14. In one embodiment, air source 14 comprises a compressor. Air source line 22 can be coupled to multiple air distribution lines for powering multiple dispensers. Air distribution line 20 includes other components such as filters 24, valves 26 and air regulator 28. Air motor assembly 34 is fed pressurized air from air distribution line 20 at air inlet 30. Pump 18 is connected to ground 32. The pressurized air drives air motor assembly 34 within pump 18, which drives a piston within pump assembly 36. After driving air motor assembly 34, the compressed air leaves pump 18 at air exhaust port 38.

Operation of the piston within pump assembly 36 draws lubricant, such as oil, from container 12 through fluid line 40. Fluid line 40 may include a suction tube having a check valve 41 positioned to be submerged within container 12 to maintain pump 36 primed. Pump 18 pressurizes the lubricant and pushes it into discharge line 42, which is coupled to dispenser 16. Dispenser 16 includes a manually operated valve that, when actuated by an operator, dispenses the lubricant. Pressurized lubricant is thus located from the piston head within pump cylinder 36 to the valve within dispenser 16. The pressurized fluid is not, therefore, provided with any extra space to accommodate for thermal expansion of the fluid. Conventional lubricant dispensing systems incorporate a relief valve in line 42, which opens under over-pressure conditions. However, incorporation of such a relief valve adds extra complexity to the system, thereby increasing the number of parts and the cost. Furthermore, incorporation of these relief valves requires installation on the part of the operator of the system. In lubricant dispensing system 10 of the present invention, pump 18 is provided with an integrated thermal relief system that automatically operates without activation or installation from an operator. Such a thermal relief system of the present invention also requires no additional parts, thereby minimizing complexity and expense. Although described with reference to lubricants and lubricant dispensing systems, pump 18 of the present invention can be employed to pump other fluids in other systems.

Figure 2:
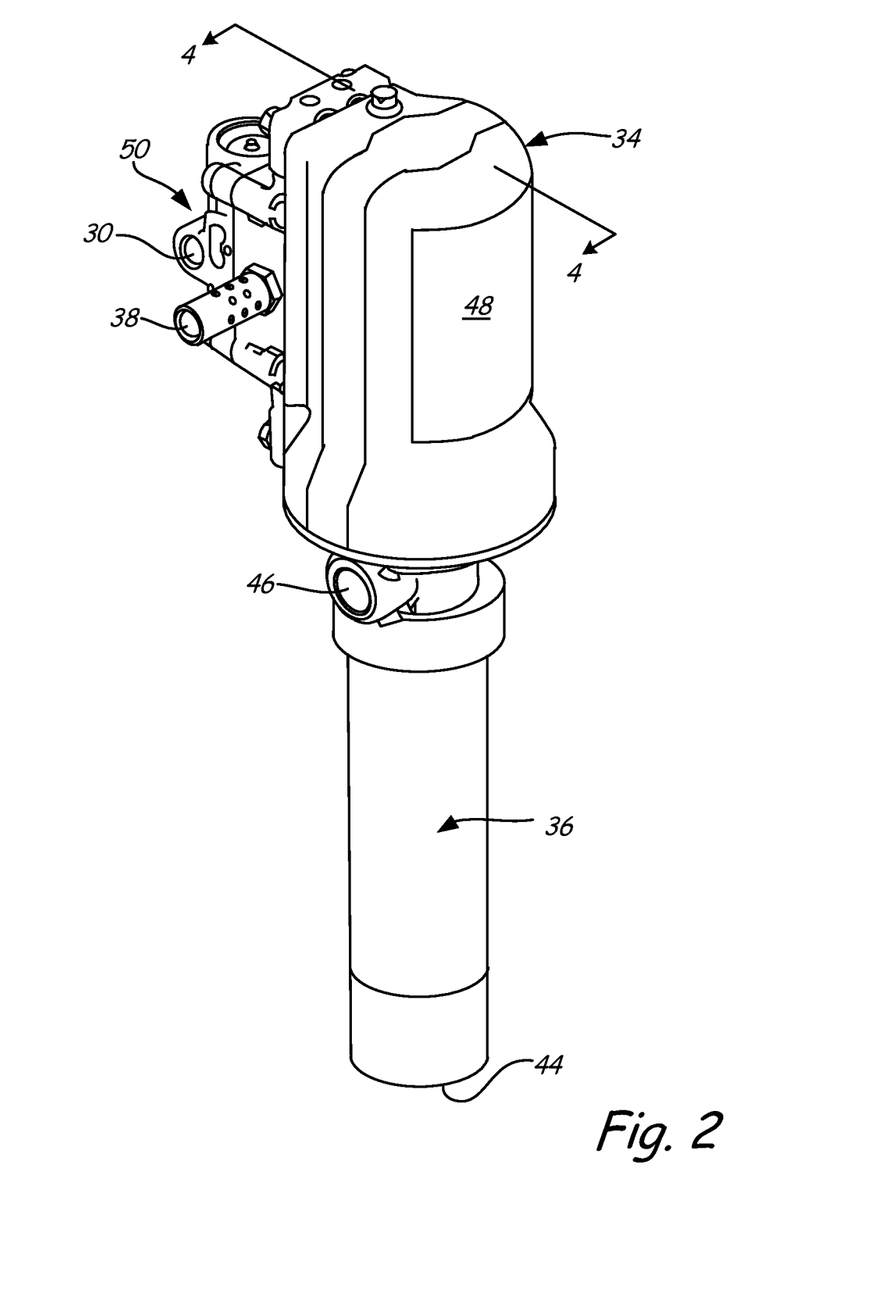
FIG. 2 is a perspective view of the linear displacement pump of FIG. 1 showing a pump assembly coupled to an air motor assembly.

FIG. 2 is a perspective view of linear displacement pump 18 of FIG. 1 showing air pump assembly 36 coupled to air motor assembly 34. Pump 18 also includes inlet 30, fluid inlet 44, fluid outlet 46, air motor cylinder 48 and reversing air valve kit 50. As discussed above, compressed air is provided to inlet 30 to drive the air motor within cylinder 48. Spent air is discharged from pump 18 at air exhaust port 38. Reversing air valve kit 50 includes valves that alternately provide compressed air to opposite sides of an air piston within cylinder 48, as is know in the art. A fluid, such as oil, is drawn into the bottom of pump cylinder 36 at fluid inlet 44, and discharged at fluid outlet 46. The thermal relief system of the present invention permits fluid upstream of outlet 46 to pass backwards through the piston within pump assembly 36 and a check valve within inlet 44 to travel back to container 12 (FIG. 1) upstream of inlet 44, thereby providing an overflow purge circuit to relief pressure from thermal expansion of the fluid.

Figure 3:
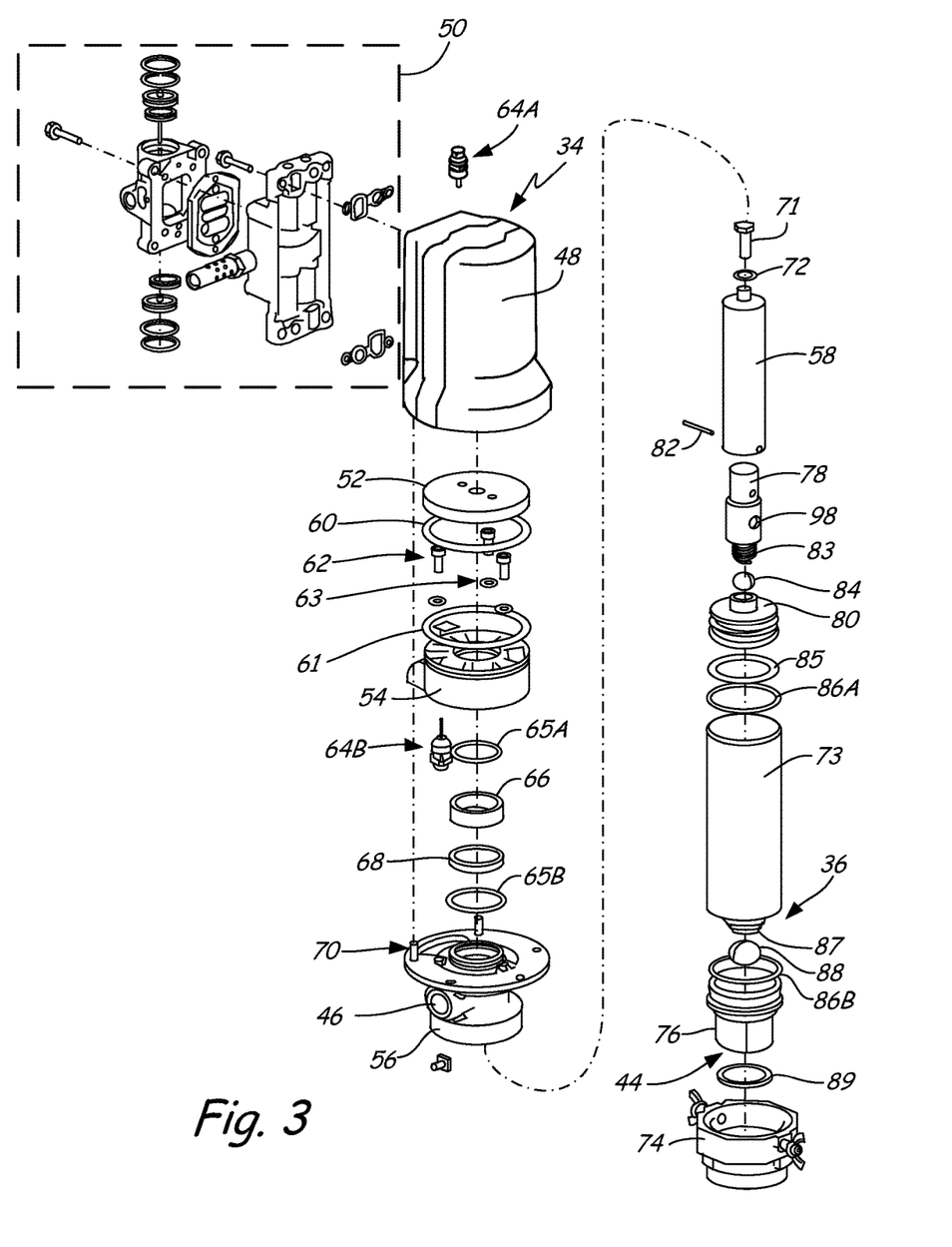
FIG. 3 is an exploded view of the linear displacement pump of FIG. 2 showing connection of the air motor assembly, the pump assembly and a valve kit.

FIG. 3 is an exploded view of linear displacement pump 18 of FIG. 2 showing connection of air motor assembly 34, pump assembly 36 and valve kit 50. Air motor assembly 34 includes cylinder 48, air piston 52, bottom cover 54, outlet housing 56 and displacement rod 58. Air motor assembly 34 further comprises piston seal 60, cover seal 61, fasteners 62, fastener seals 63, pilot valves 64A and 64B, seals 65A and 65B, bearing 66, u-cup seal 68, cover fasteners 70, rod fastener 71 and rod washer 72. Pump assembly 36 includes cylinder 73, adapter 74, inlet valve housing 76, piston holder 78 and pump piston 80. Pump assembly 36 further comprises spring pin 82, first spring 83, first ball 84, piston seal 85, cylinder seals 86A and 86B, second spring 87, second ball 88 and strainer 89. FIG. 3 will be discussed concurrently with FIG. 4.

Figure 4:
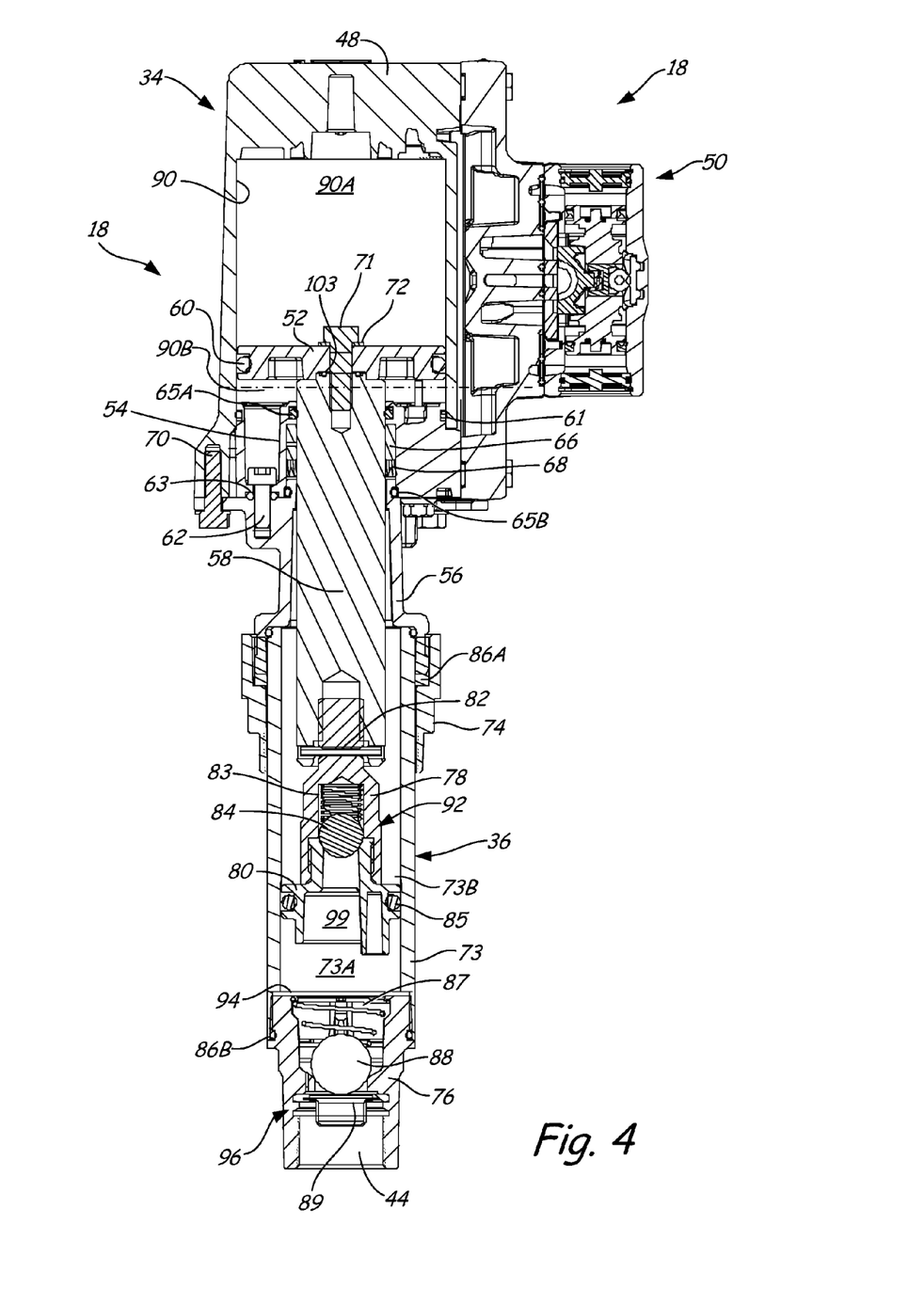
FIG. 4 is a cross-section of the linear displacement pump of FIG. 2 showing an air motor piston coupled to a pump piston using an air motor rod and a piston holder.

FIG. 4 is a cross-section of linear displacement pump 18 of FIG. 2 showing air motor piston 52 coupled to pump piston 80 using air motor rod 58 and pump holder 78. Pump 18 includes air motor assembly 34, pump assembly 36 and valve kit 50, which each include the components listed with reference to FIG. 3. Air motor piston 52 is connected to rod 58 using fastener 71 and washer 72. Piston 52 resides within cylinder wall 90 inside air motor cylinder 48. Piston 52 rides against cylinder wall 90 with seal 60 being trapped between piston 52 and cylinder wall 90. Valve kit 50 is fluidly coupled to opposite sides 90A and 90B of cylinder on either side of piston 52. Outlet housing 56 is coupled to cylinder 48 via a plurality of fasteners 62. Bottom cover 54 is coupled to outlet housing 56 via a plurality of fasteners 62. Rod 58 extends through bottom cover 54 and outlet housing 56. Piston cylinder 73 is coupled to outlet housing 56 via adapter 74. Piston holder 78 is coupled to rod 58 via threaded connection and pin 82 within piston cylinder 73. Pump piston 80 is joined to piston holder 78 via any suitable mechanical coupling such as by a threaded engagement. Pump piston 80 resides within cylinder 73. Pump piston 80 rides against pump cylinder 73 with seal 85 being trapped between piston 80 and cylinder 73.

First ball 84 and first spring 83 are disposed between piston 80 and piston holder 78. First spring 83 biases first ball 84 against a ball seat in piston 80 to form first check valve, or outlet valve, 92. Inlet valve housing 76 is joined to piston cylinder 73 via any suitable mechanical coupling such as by a threaded engagement. Second ball 88 and second spring 87 are disposed within valve housing 76 and retained by flange 94. Second spring 87 biases second ball 88 against a ball seat in valve housing 76 to form second check valve, or inlet valve, 96. Strainer 89 is force fit or snap fit into valve housing 76 to between ball 88 and inlet 44.

Valve kit 50 includes a reversing valve that alternatively provides air to opposite sides 90A and 90B of cylinder wall 90 on either side of piston 52, as is known in the art. Rod 58 is thereby driven to reciprocate linearly within bearing 66 inside bottom cover 54. Seal 60 prevents air from passing around piston 52. Piston 52 is driven by rod 58 to reciprocate linearly within cylinder wall 90. The reversing valve of valve kit 50 is controlled by impact of piston 52 with pilot valves 64A and 64B (FIG. 3), as is known in the art. Seals 65B seals between bottom cover 54 and outlet housing 56, while seal 65A seals around displacement rod 58. Seal 65A prevents air from cylinder wall 90 from entering bottom cover 54, and seal 65B prevents air from entering outlet housing 56. Bearing 66 facilitates smooth translation of rod 58 and u-cup seal 68 prevents fluid from within piston cylinder 73 from entering air cylinder wall 90. Rod 58 drives piston holder 78 and pump piston 80 to pump fluid from inlet 44 to outlet 46.

Pump assembly 36 is a double-acting pump such that, in conjunction with check valves 92 and 96, fluid is pumped out of outlet 46 on both an up-stroke and a down-stroke of piston 80. As rod 58 travels upward (with reference to the orientation of FIG. 4) on an up-stroke, piston holder 78 and pump piston 80 are drawn upward through threaded engagement and spring pin 82. Upward movement of pump piston 80 produces a vacuum within chamber 73A of pump cylinder 73 that causes second check valve 96 to open and fluid from inlet 44 and container 12 (FIG. 1) to be draws into cylinder 73. Specifically, ball 88 is drawn away from its ball seat in valve housing 76 by the vacuum, overcoming the force of spring 87. The vacuum produced in chamber 73A also helps maintain ball 84 against its ball seat in piston 80, which augments the force of spring 83. Any fluid already present within chamber 73B of cylinder 73 is prevented from traveling upstream from chamber 73B back to chamber 73A via first check valve 92. Specifically, fluid within chamber 73B is prevented from traveling backwards through holes 98 (FIG. 3) in holder 78 via ball 84 of first check valve 92. Piston 80 pushes fluid present in chamber 73B into outlet housing 56 where the fluid is forced through outlet 46 (FIG. 3). On a down-stroke, piston 80 pushes fluid within chamber 73A into opening 99 within piston 80. The fluid is pushed through first check valve 92 as the pressure from the fluid in chamber 73A pushes ball 84 away from its ball seat in piston 80. After passing through opening 99 and entering piston holder 98, the fluid travels into chamber 73B through holes 98 (FIG. 3). Simultaneously, fluid within chamber 73B is pushed out of outlet 46 (FIG. 3). Piston 80 thereby can continue to reciprocate within cylinder 73, pumping fluid on both up-strokes and down-strokes.

Due to the double-acting pumping of pump 18, both chambers 73A and 73B remain full of pressurized fluid while pump 18 is primed, even when pump 18 is not actively operating. Fluid within chamber 73B is fluidly coupled to outlet 46 (FIG. 3), discharge line 42 (FIG. 1) and dispenser 16 (FIG. 1). This fluid is trapped within a fixed volume with no room to accommodate volumetric expansion from thermal heating due to a valve within dispenser 16 and valve 92 being closed and valve 96 being closed to prevent downward travel of the assembly of piston 80 and rod 58. As such, any thermal expansion of the pressurized fluid due to elevation of ambient temperatures increases the pressure within chambers 73A and 73B, thereby requiring venting of the fluid. Thermal expansion of the fluid pushes piston 80 downward, further pressurizing fluid within chamber 73A. The present invention provides two modes of purging or venting to accommodate the double-acting pumping of piston 80. Specifically, a purge circuit is provided to permit fluid to vent back to inlet 44, fluid line 40 (FIG. 1) and container 12 (FIG.

1) where additional volume is provided. A first purge passage is provided to permit fluid trapped within chamber 73A to bypass check valve 96 and enter inlet 44. A second purge passage is provided to permit fluid within chamber 73B to bypass check valve 92 and enter chamber 73A.

Figure 5:
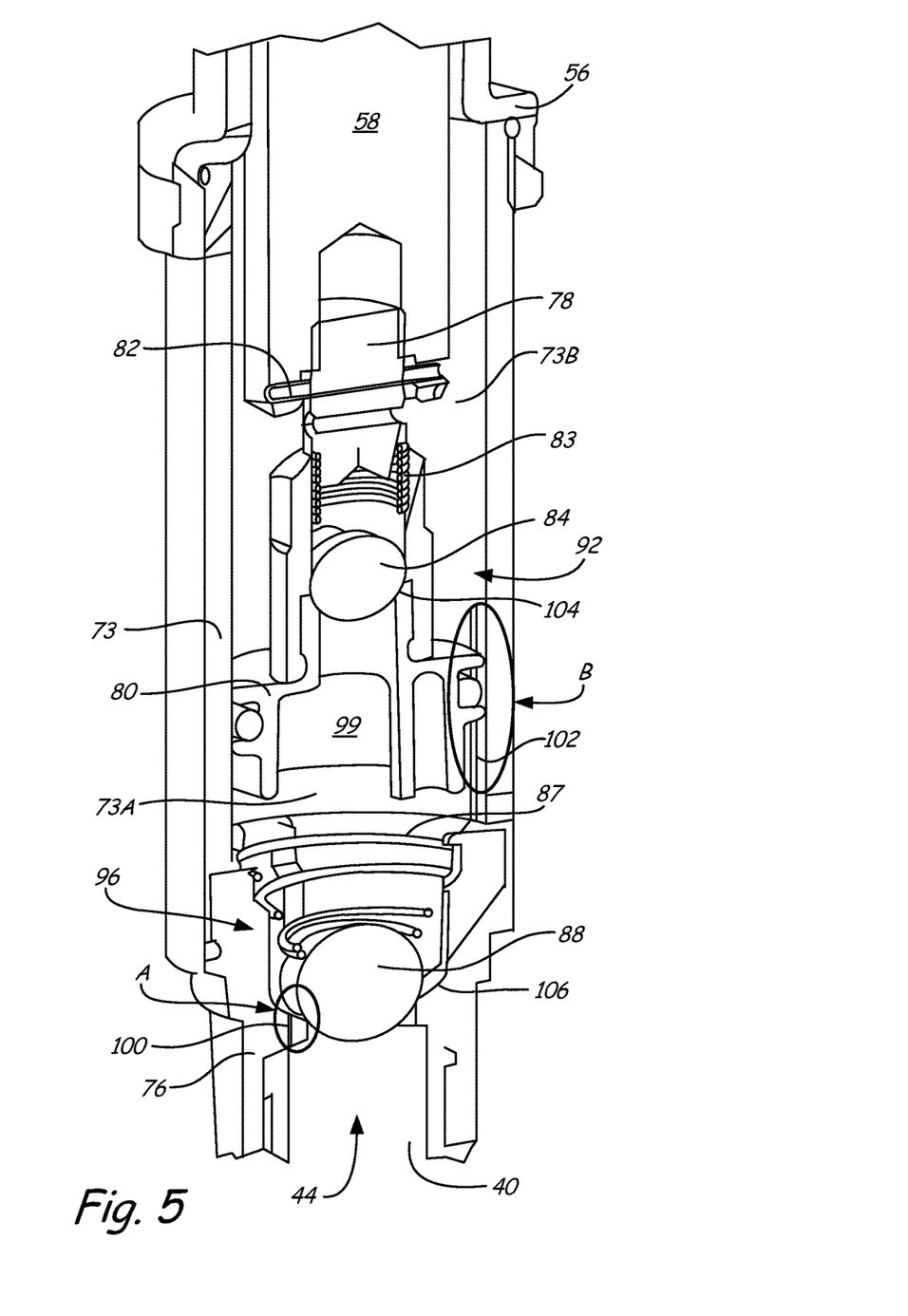
FIG. 5 is a close-up of the pump assembly of FIG. 4 showing fluid check valves and bypass passages of the present invention.
Figure 6:
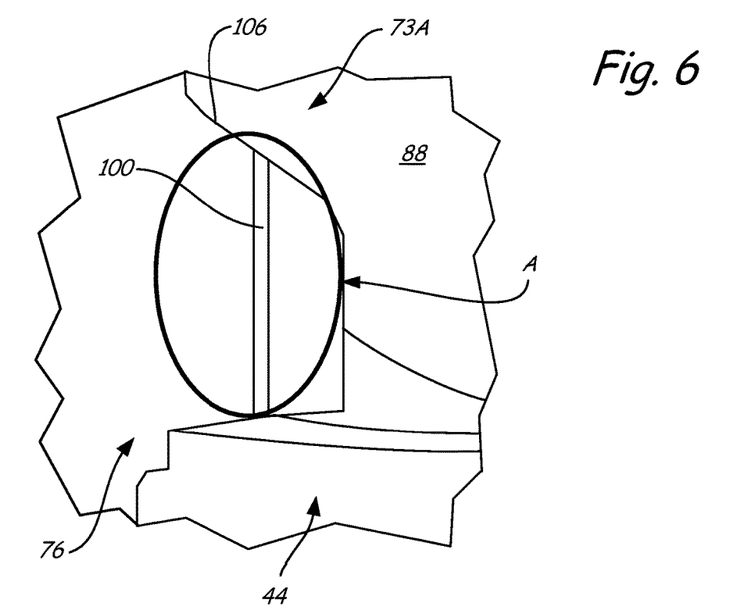
FIG. 6 is a close-up of detail A of FIG. 5 showing a first bypass passage around an inlet check valve.
Figure 7:
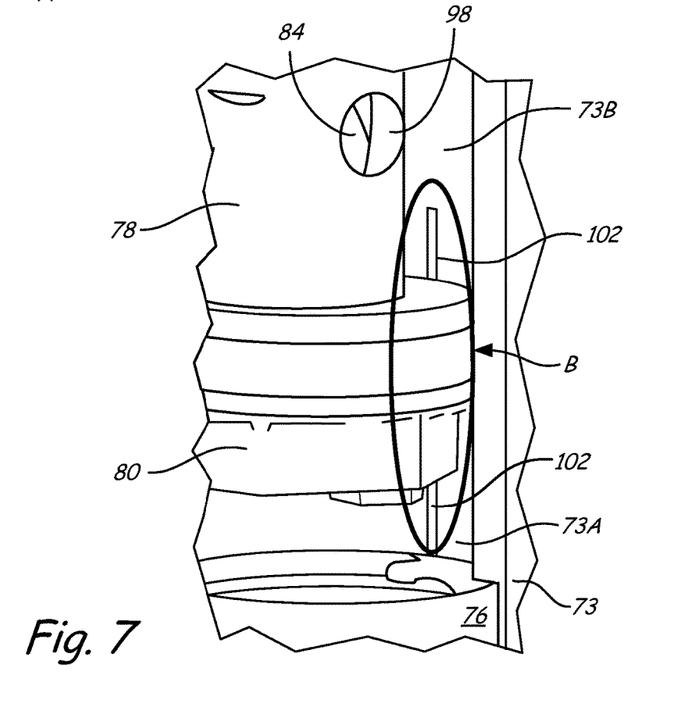
FIG. 7 is a close-up of detail B of FIG. 5 showing a second bypass passage around the pump piston.

FIG. 5 is a close-up of pump assembly 36 of FIG. 4 showing fluid check valves 92 and 96 and bypass passages 100 and 102 of the present invention. FIG. 6 is a close-up of detail A of FIG. 5 showing first bypass passage 100 around inlet check valve 96. FIG. 7 is a close-up of detail B of FIG. 5 showing second bypass passage 102 around pump piston 80. FIGS. 5, 6 and 7 will be discussed concurrently.

Outlet check valve 92 comprises ball 84, which is pushed against ball seat 104 by spring 83. Inlet check valve 96 comprises ball 88, which is pushed against ball seat 106 by spring 87. Ball seat 104 is formed into piston 80, and ball seat 106 is formed into housing 76. Outlet valve 92 provides a barrier between chambers 73B and 73A of cylinder 73, permitting fluid to flow from chamber 73A into chamber 73B, but not in the reverse direction. Inlet valve 96 provides a barrier between chamber 73A and inlet 44, permitting fluid to flow from inlet 44 into chamber 73A, but not in the reverse direction.

As shown in FIG. 6, bypass passage 100 fluidly couples chamber 73A and inlet 44. In the embodiment shown, bypass passage 100 extends through the interior of housing 76. In particular, bypass passage 100 comprises a bore around ball seat 106 for inlet valve 96 and exiting into inlet 44. In the embodiment shown, bypass passage 100 has a diameter of about 0.5 mm (0.020 inch). Bypass passage 100 is spaced away from portions of ball seat 106 that contact ball 88 to prevent scoring of ball 88 and denting or damaging of bypass passage 100 by ball 88.

As shown in FIG. 7, bypass passage 102 fluidly couples chamber 73A and chamber 73B. In the embodiment shown, bypass passage 102 extends across cylinder 73. In particular, bypass passage 102 comprises a channel or chamfer extending along an inner surface of cylinder 73. Although only a single passage is shown, cylinder 73 can be provided with multiple bypass passages 102. For example, two bypass passages 102 can be spaced one-hundred-eighty degrees apart from each other on the inner surface of cylinder 73. In the embodiment shown, bypass passage 102 has a diameter of about 0.5 mm (0.020 inch).

Bypass passage 102 begins at the lowest-most point where the bottom of piston 80 travels to, with reference to the orientation of FIGS. 5-7. This permits fluid within chamber 73A between piston 80 and inlet valve 96 to be fluidly coupled to bypass passage 102. In the embodiment shown, bypass passage 102 extends along the inner surface of cylinder 73 to engage the top end of housing 76, with reference to the orientation of FIGS. 5-7. Bypass passage 102 need not extend along the entire length or height of cylinder 73. Bypass passage 102 has a length greater than the height of piston 80. This permits fluid within chamber 73B between piston 80 and outlet 46 (FIG. 3) to be fluidly coupled to bypass passage 102 only when piston 80 is at or near the extreme bottom-most position of FIG. 5.

When fluid in line 42 begins to thermally expand, the pressure within chambers 73A and 73B begins to rise, fluid already within chamber 73A vents directly through bypass passage 100. Additionally, fluid within chamber 73B pushes piston 80 downward, thereby also forcing the fluid within chamber 73A out bypass passage 100. Continual thermal expansion of fluid in line 42 causing high pressure within chamber 73B will cause piston 80 to reach the limit of the down-stroke, thereby again fixing the volume between dispenser 16 (FIG. 1) and outlet valve 92. After fluid within chamber 73A is vented through bypass passage 100, fluid pressure within chamber 73B can continue to relieve as dictated by temperatures using the purge circuit of the present invention. In order to permit unlimited thermal expansion of fluid within chamber 73B, chamber 73B is fluidly coupled to chamber 73A when piston 80 is moved into the vicinity of inlet valve 96. In particular, a complete purge circuit is formed when piston 80 is moved into a position where bypass passage 102 extends across piston 80 to form a continuous path from chamber 73B, passage 102, chamber 73A and passage 100. Thus, a path between dispenser 16 (FIG. 1) and container 12 (FIG. 1) is always present to permit any volume of fluid upstream of pump 18 to vent back to container 12 downstream of pump 18. Although this path remains open during operation of pump 18, any inefficiency in the pumping action is insignificant to the overall operation of pump 18 due to the small diameter of passages 100 and 102.

As piston 80 moves downward, rod 58 is also pulled downward, which drives air motor assembly 34 (FIG. 4) in reverse, thereby compressing air in cylinder 90B. Regulator valve 28 (FIG. 1) permits air from within cylinder 48 (FIG. 4) of air motor assembly 34 to escape through valve kit 50 rather than compressing to a level that freezes up or locks any further movement of piston 52. Regulator valve 28 permits smooth operation of the thermal relief of the present invention by eliminating air within air motor assembly 34 from generating a back pressure. The thermal relief system of the present invention can operate without a regulator valve, but compression of air within cylinder wall 90 increases the activation pressure at which fluid will flow through passages 100 and 102. In other embodiments, a master bleed air valve in a closed position can be used in place of regulator valve 28.

The thermal relief system of the present invention provides a further benefit to the operation of pump 18. Bypass passage 102 prevents piston 52 from stalling, such as after a shutdown, in at a changeover position that will maintain pilot valve 64B in an open position, which will cause compressed air from air source 14 (FIG. 1) to continuously flow into valve kit 50. Bypass passage 102 permits pressurized fluid in chamber 73A or 73B to slowly balance between the two chambers to move air piston 52 away from the ends of cylinder wall 90 and engagement with pilot valves 64B. Likewise, bypass passage 100 prevents piston 52 from stalling, such as after a shutdown, in at a changeover position that will maintain pilot valve 64A in an open position, which will cause compressed air from air source 14 (FIG. 1) to continuously flow into valve kit 50. Bypass passage 100 permits pressurized fluid in chamber 73A or 73B to slowly balance between the two chambers to move air piston 52 away from the ends of cylinder wall 90 and engagement with pilot valves 64A.

The thermal relief system of the present invention provides a simple, pre-installed thermal relief. The thermal relief purge circuit is formed into existing parts, thereby eliminating the expense of additional components. Additionally, the thermal relief purge circuit is factory installed, which eliminates the need for installing a separate thermal relief system. This increases the inherent safety of the system. Furthermore, the thermal relief purge circuit of the present invention provides for unlimited purging of fluid downstream of the pump, greatly increasing the safety and protection offered by the system.

Although the present invention has been described with reference to preferred embodiments, workers skilled in the art will recognize that changes may be made in form and detail without departing from the spirit and scope of the invention.

The invention claimed is:
1. A piston pump comprising:
a cylinder comprising an inlet and an outlet;
a piston disposed within the cylinder between the inlet and the outlet and actuated by a motor to drive a fluid in a primary flow direction from the inlet to the outlet of the cylinder, wherein the piston has an outer surface that engages an inner surface of the cylinder to define a first chamber between the piston and the inlet of the cylinder and a second chamber between the piston and the outlet of the cylinder;
a first check valve disposed between the piston and the inlet and configured to permit flow of the fluid in the primary flow direction from the inlet to the first chamber and to prevent flow of the fluid from the first chamber to the inlet;
a second check valve disposed within the piston and configured to permit flow in the primary flow direction from the first chamber to the second chamber when the piston is actuated towards the inlet and to prevent flow from the second chamber into the first chamber when the piston is actuated towards the outlet;
a first bypass passage extending through the first check valve; and
a second bypass passage extending from the first check valve along the cylinder;
wherein the first and second bypass passages form a return path fluidically connecting the outlet to the inlet of the cylinder such that fluid is permitted to flow in a direction opposite the primary flow direction during each stroke of the piston when the piston engages the second bypass passage.

2. The piston pump of claim 1 wherein the first check valve comprises:
a ball seat disposed proximate the inlet;
a ball disposed within the ball seat; and
a spring biasing the ball into the ball seat;
wherein the first bypass passage extends through the ball seat.

3. The piston pump of claim 2 wherein the first bypass passage comprises a hole extending internally through the ball seat away from a mate face with the ball.

4. The piston pump of claim 1 wherein the piston comprises:
a disk-shaped head comprising:
a diameter to mate with that of the cylinder; and
a height;
a seal extending around the head to engage the cylinder.

5. The piston pump of claim 4 wherein the second bypass passage is longer than the height of the disk-shaped head.

6. The piston pump of claim 4 and further comprising a plurality of second bypass passages.

7. The piston pump of claim 4 wherein the second bypass passage comprises a groove extending along an inner surface of the cylinder.

8. The piston pump of claim 1 wherein the motor is an air motor having a rod coupled to the piston within the cylinder.

9. A reciprocating pump comprising:
a cylinder having a first end and a second end;
a piston disposed within the cylinder between the first end and the second end of the cylinder;
an inlet check valve disposed proximate the first end of the cylinder and configured to permit unidirectional flow from the first end of the cylinder to a first chamber between the piston and the inlet check valve;
an outlet check valve disposed within the piston and configured to permit unidirectional flow from the first chamber to a second chamber between the piston and the second end of the cylinder; and
a purge circuit extending across the inlet check valve and the outlet check valve to fluidly couple the first end and the second end of the cylinder and to permit flow in a direction opposite the unidirectional flow permitted by the inlet and outlet check valves, wherein the purge circuit comprises:
a first bypass passage extending through the inlet check valve; and
a second bypass passage extending around the piston and the outlet check valve, wherein the piston engages the second bypass passage with each stroke of the piston.

10. The reciprocating pump of claim 9 wherein:
the inlet check valve comprises:
a first ball seat disposed in a valve housing coupled to the cylinder;
a first ball; and
a first spring to bias the first ball toward the first ball seat and away from the piston; and
the outlet check valve comprises:
a second ball seat disposed in the piston;
a second ball; and
a second spring to bias the second ball toward the second ball seat and toward the inlet check valve.

11. The reciprocating pump of claim 10 wherein:
the first bypass passage comprises a bore through the first ball seat for the inlet check valve; and
the second bypass passage comprises a channel on an interior of the cylinder to extend across the piston and the outlet check valve.

12. The reciprocating pump of claim 9 and further comprising:
a suction tube coupled to the first end of the cylinder.

13. The reciprocating pump of claim 12 and further comprising:
a priming check valve disposed in the suction tube.

14. A method of providing thermal relief in a reciprocating piston pump, the method comprising:
pumping a fluid from a container upstream of a pump to a dispenser downstream of the pump by reciprocating a piston in a cylinder between a first end and a second end thereof, wherein displacing the piston towards the second end of the cylinder draws fluid through an inlet check valve proximate the first end, the inlet check valve permitting unidirectional flow from the first end to a first chamber between the piston and the inlet check valve, and wherein displacing the piston towards the first end of the cylinder pumps the fluid through an outlet check valve within the piston, the outlet check valve permitting unidirectional flow from the first chamber to a second chamber between the piston and the second end of the cylinder; and
relieving fluid pressure between the dispenser and the pump generated by thermal expansion of the fluid by passing thermally expanded fluid through a purge circuit fluidly coupling the first end and the second end to permit flow in a direction opposite the unidirectional flow permitted by the inlet and outlet check valves, wherein the purge circuit extends across the inlet check valve and the outlet check valve to connect the dispenser to the container when the piston is not reciprocating, and wherein the purge circuit comprises:
- a first passage extending through the inlet check valve between the pump and the container; and
- a second passage bypassing the piston within the cylinder, wherein the piston engages the second passage with each stroke of the piston.

15. The method of claim 14 wherein:
the first passage comprises a bore formed in a valve seat for the inlet check valve; and
the second passage comprises a channel formed on an interior of the cylinder from the first end to a height greater than that of the piston.

16. The method of claim 14 and further comprising:
balancing pressure in the cylinder on opposite sides of the piston using the purge circuit when the piston is not reciprocating.

* * * * *